US008108642B1

(12) United States Patent
Ho et al.

(10) Patent No.: US 8,108,642 B1
(45) Date of Patent: *Jan. 31, 2012

(54) METHOD AND SYSTEM FOR PLAY-ONLY MEDIA PLAYER

(75) Inventors: Chi Fai Ho, Palo Alto, CA (US); Shin Cheung Simon Chiu, Palo Alto, CA (US)

(73) Assignee: TP Labs, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/907,082

(22) Filed: Oct. 19, 2010

Related U.S. Application Data

(63) Continuation of application No. 11/595,362, filed on Nov. 9, 2006, now Pat. No. 7,840,769.

(51) Int. Cl.
*G06F 12/14* (2006.01)
(52) U.S. Cl. .......................................... 711/163; 726/26
(58) Field of Classification Search .................. 711/163; 726/26
See application file for complete search history.

(56) References Cited

U.S. PATENT DOCUMENTS

| | | | | |
|---|---|---|---|---|
| 5,045,327 A * | 9/1991 | Tarlow et al. | ................. | 704/270 |
| 5,504,836 A * | 4/1996 | Loudermilk | ................... | 704/272 |
| 5,826,235 A * | 10/1998 | Harman | ......................... | 704/500 |
| 6,584,541 B2 * | 6/2003 | Friedman et al. | ............. | 711/103 |
| 2001/0052073 A1 * | 12/2001 | Kern et al. | ..................... | 713/161 |
| 2002/0194492 A1 * | 12/2002 | Choi et al. | ..................... | 713/200 |
| 2003/0158737 A1 * | 8/2003 | Csicsatka | ....................... | 704/273 |
| 2003/0223730 A1 * | 12/2003 | Cornwell | ......................... | 386/46 |
| 2003/0226030 A1 * | 12/2003 | Hurst et al. | ..................... | 713/200 |
| 2006/0088292 A1 * | 4/2006 | Guillen et al. | ................... | 386/96 |
| 2006/0212541 A1 * | 9/2006 | Ueshima et al. | ............... | 709/219 |
| 2006/0282903 A1 * | 12/2006 | Jung et al. | ........................ | 726/27 |
| 2007/0100757 A1 * | 5/2007 | Rhoads | ............................ | 705/51 |

* cited by examiner

*Primary Examiner* — Jared Rutz
(74) *Attorney, Agent, or Firm* — North Shore Patents, P.C.; Michele Liu Baillie

(57) ABSTRACT

A method and system for play-only media player is disclosed. The player includes a controller, a recording interface, and a non-removable storage. In recording content onto the media player, media signals are received through the recording interface. The media signals are stored in a media file on non-removable storage. When a controller receives a disable recording indication, it permanently disables the recording capabilities of the media player. The media file now is not accessible except for the purpose of playing the media file. To play the media file, a play indication is received by the controller. The controller then retrieves the content from the media file and sends the content to an output interface. In this manner, the media player only plays pre-loaded media content. The digital right for the content is protected against unauthorized copying while maintaining user friendliness of the media player.

29 Claims, 4 Drawing Sheets

METHOD AND SYSTEM FOR PLAY-ONLY MEDIA PLAYER

CROSS-REFERENCE TO RELATED APPLICATIONS

The present application is a continuation of U.S. patent application Ser. No. 11/595,362, filed on Nov. 9, 2006, now U.S. Pat. No. 7,840,769.

BACKGROUND OF THE INVENTION

1. Field

This invention relates generally to media, particularly to a system and method for media player that only plays pre-loaded media content.

2. Related Arts

Digitization of pictures, music and movies brings convenience to the entertainment and media industry. Digital media has proved to be a highly efficient and effective distribution mechanism. For example, digital music download, music ripping and music CD burning by consumers are common.

The ease of media file distribution has had major business implications, especially in illegal copying. Examples were illegal music download through peer-to-peer copying mechanisms like Napster, or Kazaa. Or more frequently, a consumer copies downloaded music in MP3 format to CD's and MP3 players. In one example, John is a high school student. He, on Tuesday, purchased and downloaded last week's top 10 pop songs. He burned a music CD for his desktop music system with the songs. In addition, he ripped the songs to his iPod, his sisters' MP3 players, and his father's home media center. After John talked to his friends in the school, John copied the files to his classmates' MP3 players.

Several security mechanisms are being introduced to address the problem. They are mainly related to digital right management (DRM), where a signature is put into a media file, and a user is given a key. A media player would be able to play the media file only after the user presents the key. Often times, the key is given to the media player so that the media player can play the media file while other media players cannot play the media file. Although such security mechanisms partially solve the copying problem, they are very inconvenient to users. As in the above example, John downloaded to his PC the songs with DRM protection. In one embodiment, the key was given to John's PC. John was able to listen to the songs. After John ripped the songs to his iPod, he cannot play the songs with his iPod. Over a weekend, John's buys a new PC and transfers the songs to the new PC. John cannot play the songs on the new PC as the new PC does not have the key.

The above illustrates a need for a user friendly solution to protect against unauthorized copying of media content.

BRIEF SUMMARY OF THE INVENTION

A method and system for play-only media player is disclosed. The player includes a controller, a recording interface, and a non-removable storage. In recording content onto the media player, media signals are received through the recording interface. The media signals are stored in a media file on non-removable storage. When a controller receives a disable recording indication, it permanently disables the recording capabilities of the media player. The media file now is not accessible except for the purpose of playing the media file. To play the media file, a play indication is received by the controller. The controller then retrieves the content from the media file and sends the content to an output interface. In this manner, the media player only plays pre-loaded media content. The digital right for the content is protected against unauthorized copying while maintaining user friendliness of the media player.

DETAILED DESCRIPTION OF THE INVENTION

Figure 1:
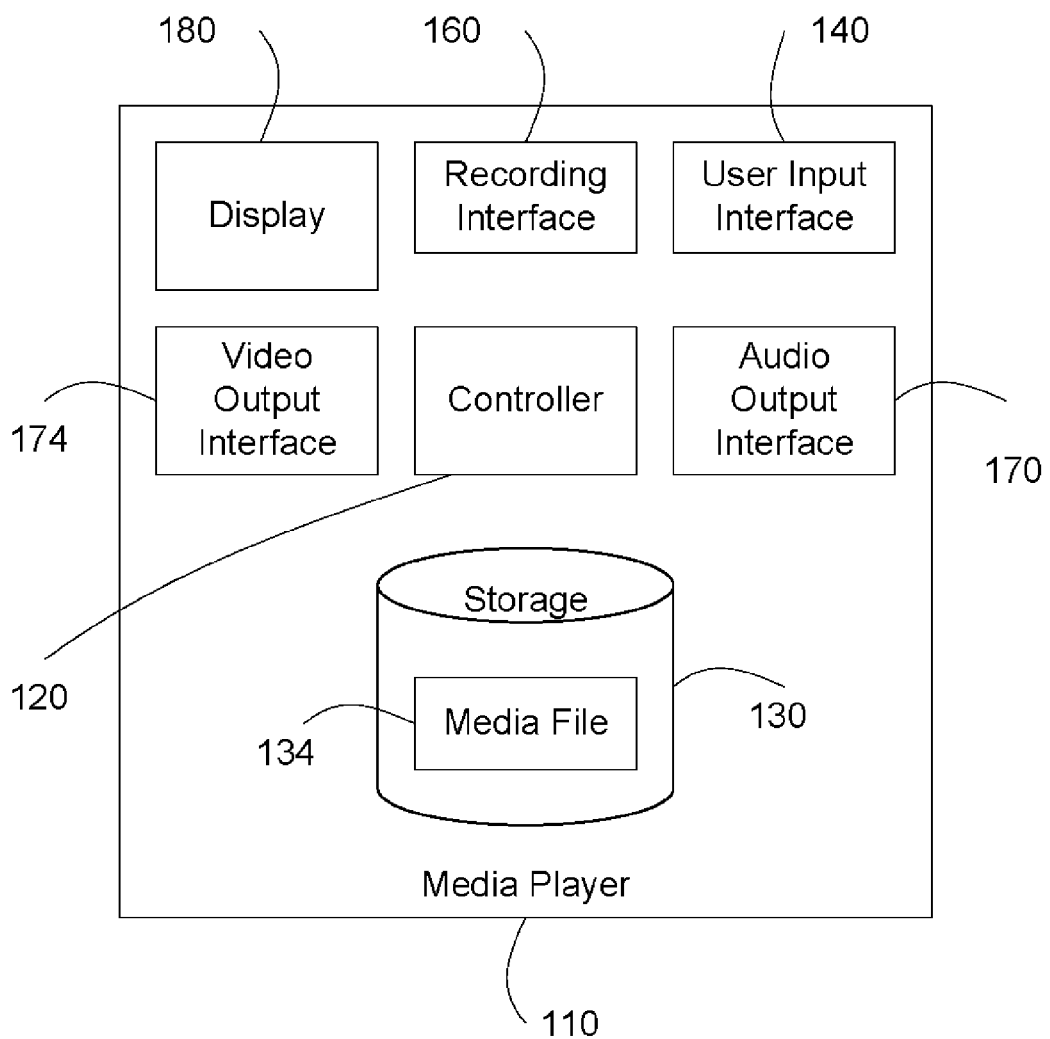
FIG. 1 illustrates a play-only pre-recorded media player.

FIG. 1 illustrates a play-only pre-recorded media player.

Media player 110 includes a plurality of components—controller 120, non-removable storage 130, recording interface 160, user input interface 140, and a display 180.

Storage 130 stores at least one media file 134. In one embodiment, media file 134 is an audio media file such as a song, an audio recording, a music concert recording, a talk show or an interview recording. In one embodiment, media file 134 is a music album. In one embodiment, media file 134 is a video media file such as a movie, a video recording such as a television program, a concert or a theatrical play recording, a music television (MTV™), a short film, a cooking, exercise or self-improvement instructional program, a documentary, a comic performance, or a lecture recording.

In one embodiment, storage 130 includes flash memory, or a hard disk drive. In one embodiment, storage 130 includes a database.

In one embodiment media file 134 include audio information; media player 110 includes an audio output interface 170 for audio information presentation. In one embodiment, audio output interface 170 includes an audio jack of various sizes, such as ¼" (6.35 mm), ⅛" (3.5 mm) or 3/32" (2.5 mm). In one embodiment, the audio jack is a two-conductor version for monophonic audio, or a three-conductor version for stereophonic audio. In one embodiment, audio output interface 170 includes a radio transmitter based on Personal Area Network (PAN) technology, such as Bluetooth technology. In one embodiment, audio output interface 170 includes a Radio Corporation of America (RCA) jack also known as a phono jack. In one embodiment, audio output interface 170 includes a speaker.

In one embodiment media file 134 includes video information. Media player 110 includes a video output interface 174 for video information presentation. In one embodiment, video output interface 174 includes a graphical display screen, such as a Thin-Film Transistor (TFT) screen, a Plasma Display Panel (PDP), a Liquid Crystal Display (LCD), or a Surface-conduction Electron-emitter Display (SED). In one embodiment, video output interface 174 includes an RCA jack, a composite video interface, or an S-Video interface. In one embodiment, video output interface 174 includes a High-Definition Multimedia Interface (HDMI) interface, or a High-Bandwidth Digital Content Protection (HDCP) interface. In an embodiment, video output interface 174 includes display 180.

Controller 120 records through recording interface 160 to storage 130. In one embodiment, recording interface 160 includes a Universal Serial Bus (USB) interface. In one embodiment, recording interface 160 includes an audio jack, an RCA jack, a component video interface, a composite video interface, or an S-Video interface. In one embodiment, recording interface 160 includes a High-Definition Multimedia Interface (HDMI) interface, or a High-Bandwidth Digital Content Protection (HDCP) interface. In one embodiment, recording interface 160 includes a network interface, such as an Ethernet interface.

Figure 2:
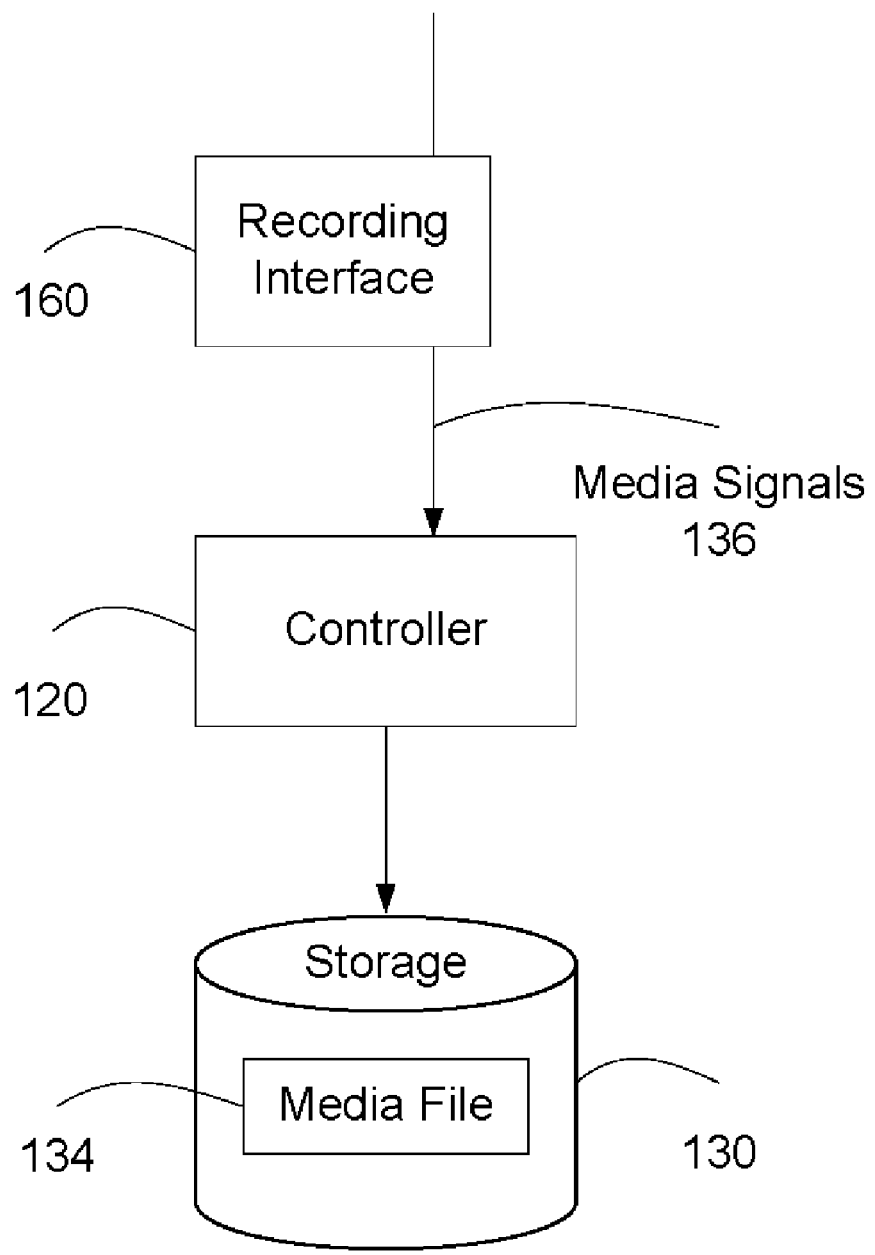
FIG. 2 illustrates a process for recording.

FIG. 2 illustrates a process for recording.

Controller 120 receives a plurality of media signals 136 through recording interface 160. In one embodiment, the plurality of media signals 136 are monophonic or stereophonic analog audio signals. In one embodiment, the plurality of media signals 136 are digital audio signals, such as Pulse Code Modulation (PCM) digital audio signals in 8 kHz 8-bit monophonic, 8 kHz 16-bit stereophonic, or 44.1 kHz 16-bit stereophonic format. In one embodiment, the plurality of media signals 136 are in a compressed codec format such as G723.1. In one embodiment, the plurality of media signals 136 are in Moving Picture Experts Group 1 (MPEG-1 Level-3) also known as MP3 digital format. In one embodiment, the plurality of media signals 136 are analog video signals in National Television System Committee (NTSC) or phase-alternating line (PAL) format. In one embodiment, the plurality of media signals 136 are digital video signals, such as MPEG-4, Windows Media Video (WMV) or Society of Motion Picture and Television Engineers (SMPTE) format.

Controller 120 stores media signals 136 in storage 130. Controller 120 combines a plurality of media signals 136 into media file 134 in storage 130.

In one embodiment, controller 120 records media file 134 by performing a media file transfer and media signals 136 includes portion of media file 134.

In another embodiment, controller 120 records media file 134 in a live performance setting, such as during a concert, a studio recording session, or a live interview. For example, controller 120 receives media signals 136 through recording interface 160 from a media system, such as a media mixer, a media amplifier, a studio production system, or a home entertainment system. The media system captures the live performance via one or more capturing devices such as microphone or video camera, processes or combines the captured signals into media signals 136 before sending to recording interface 160.

In one embodiment, controller 120 converts media signals 136 prior to storing in storage 130. In an embodiment, controller 120 converts analog audio signals into digital format such as MP3 format or PCM format. In one embodiment, controller 120 converts analogy video signals such as NTSC or PAL signals into MPEG4 format. In one more embodiment, controller 120 converts media signals 136 from a digital format to a different digital format prior to storing in storage 130.

In one embodiment, media signals 136 indicate an end of media file 134. Controller 120 completes storing media file 134 and starts storing subsequent received media signals to a new media file.

Figure 3:
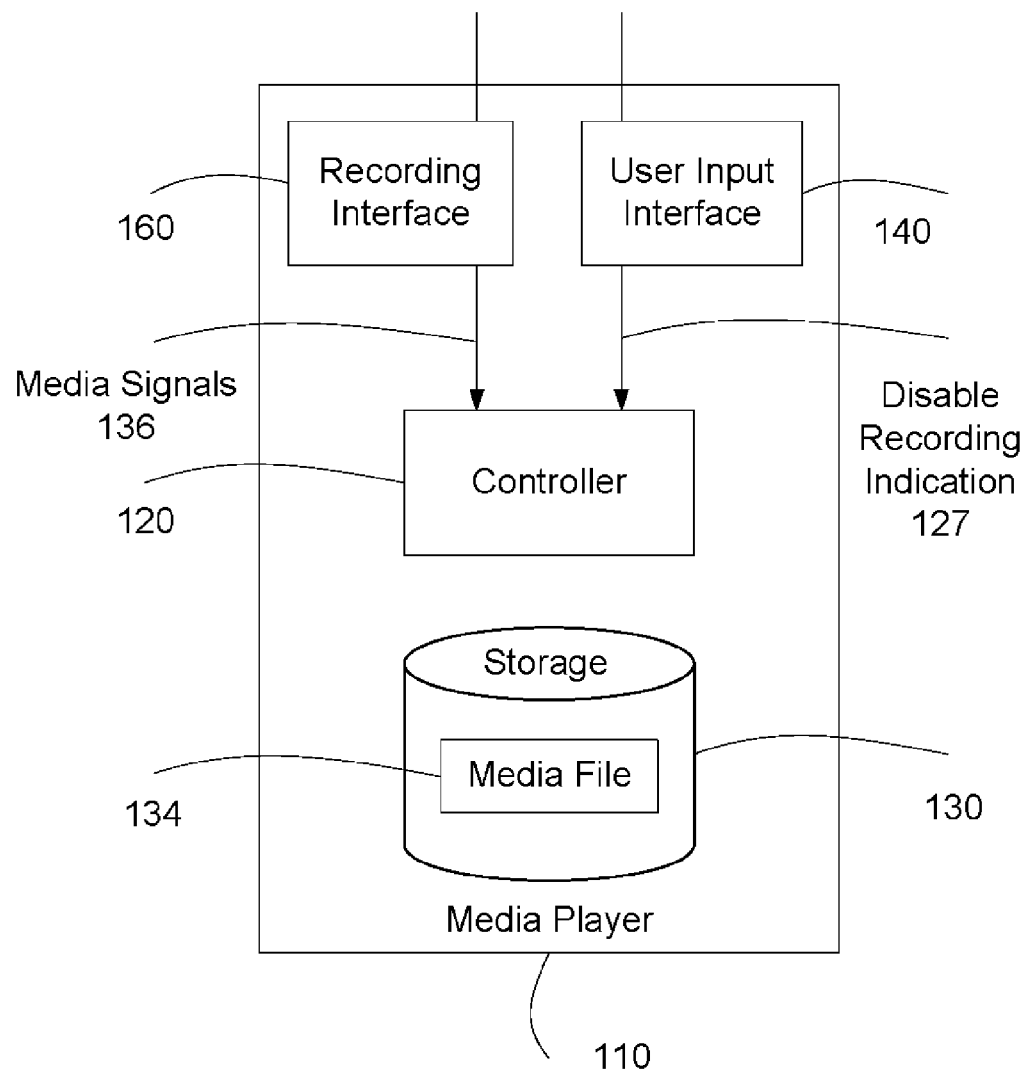
FIG. 3 illustrates a process for disabling recording.

FIG. 3 illustrates a process for disabling recording.

Controller 120 receives disable recording indication 127 from recording interface 160, or user input interface 140. After receiving disable recording indication 127, controller 120 permanently turns off recording capability. Subsequently controller 120 does not record media files into storage 130.

In one embodiment, controller 120 disables recording interface 160. In one embodiment, controller 120 permanently does not accept any media signal 136 from recording interface 160. In one embodiment, controller 120 discards any media signal 136 received from recording interface 160. In one embodiment, controller 120 permanently disables recording interface 160 such that recording interface 160 cannot receive any media signals. In one embodiment, recording interface 160 includes a hardware register, a relay, or a flip-flop; controller 120 permanently sets recording interface 160 such that recording interface 160 cannot receive any media signals.

In a different embodiment, an operator physically removed recording interface 160, or closes or seals the opening of recording interface 160 rendering recording interface 160 inoperable.

Once the recording capabilities of the media player 110 is disabled, the media file 134 cannot be accessed except by the controller 120 for the purpose of playing the media file 134.

Figure 4:
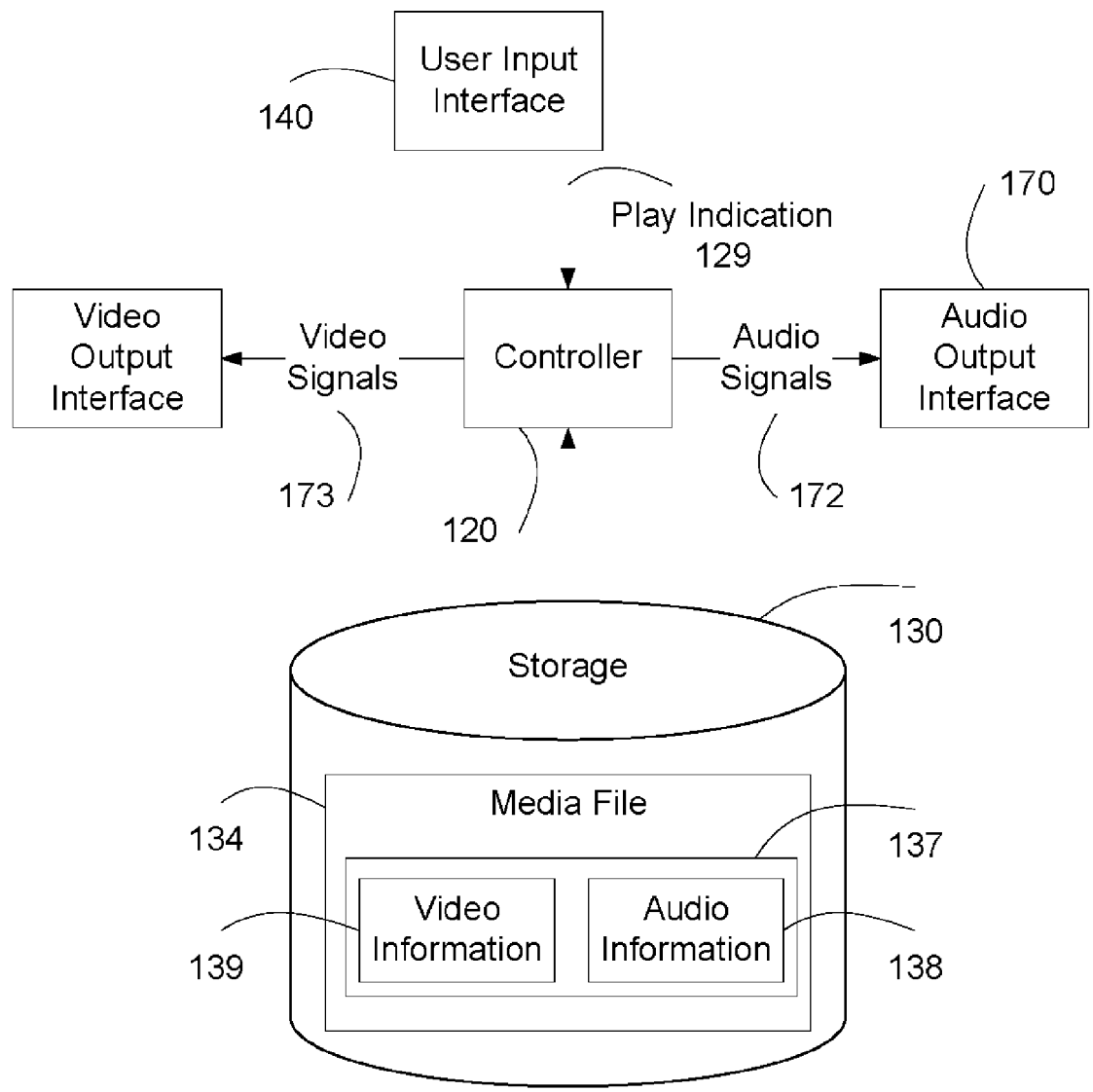
FIG. 4 illustrates a process for playing media file.

FIG. 4 illustrates a process for playing media file.

Controller 120 plays media file 134.

Controller 120 receives a play indication 129 from user input interface 140 to play. In one embodiment, play indication 129 specifies media file 134. In one embodiment, controller 120 selects media file 134. In an example, controller 120 selects randomly, the previously played media file, or the first media file from a file list.

Controller 120 retrieves content 137 from media file 134. In one embodiment, content 137 includes audio information 138. Controller 120 converts audio information 138 to audio signals 172, and sends audio signals 172 to audio output interface 170. In one embodiment, controller 120 converts MP3 digital signals into analog audio signals. In one embodiment, controller 120 converts a compressed digital audio format such as G723.1 into PCM format. In one embodiment, controller 120 converts the audio component of MPEG-4 format into analog audio signals.

In one embodiment, content 137 includes video information 139. Controller 120 converts video information 139 into video signals 173, and sends video signals 173 to video output interface 174. In one embodiment, controller 120 converts the video component of MPEG-4 format into the video component of NTSC format. In one embodiment, controller 120 converts the video component of MWV format into PAL format.

In one embodiment, media file 134 includes additional information such as an artist name, an author name, a music title, a movie title, time duration, or an album name. Controller 120 displays the information on display 180.

In one embodiment, display 180 includes a graphical or textual display screen. In one embodiment, display 180 includes a Light-emitting Diode (LED). In one embodiment, media player 110 does not include display 180.

In one embodiment, media player 110 is for audio recording for a concert, an interview, or a syndicated audio program. In one embodiment, media player 110 is for video recording for a play, a concert or a sports event. In one embodiment, media player 110 is for promotion purpose, such as corporate product promotion, market promotion, company promotion or event promotion. In one embodiment, media play 110 is for media distribution. In one embodiment, media player 110 is for rental purpose. In one embodiment media player 110 plays media file 134 only once, maximum three times or within 24 hours.

In one embodiment, media player 110 includes a non-replaceable and non-rechargeable battery as power source. Media player 110 cannot play media file 134 once the battery is fully discharged.

In one embodiment, the controller 120 and the non-removable storage 130 are integrated on a system on chip (SOC).

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A method for recording content onto a media player, comprising:
   (a) receiving a plurality of media signals through a recording interface;
   (b) storing the plurality of media signals in a media file on a non-removable storage;
   (c) receiving a disable recording indication; and
   (d) in response to the disable recording indication, permanently disabling capabilities of the media player to record onto the non-removable storage.

2. The method of claim 1, wherein the plurality of media signals comprises audio signals, video signals, or textual signals.

3. The method of claim 1, wherein the permanently disabling (d) comprises:
   (d1) in response to the disable recording indication, permanently disabling through the recording interface the capabilities of the media player to record onto the non-removable storage.

4. The method of claim 1, further comprising:
   (e) playing content from the media file.

5. The method of claim 4, wherein the media player cannot play the media file once the media file has been played a predetermined number of times.

6. The method of claim 4, wherein the media player cannot play the media file after a predetermined period of time.

7. A media player, comprising:
   a non-removable storage;
   a recording interface; and
   a controller, wherein the controller:
      receives a plurality of media signals through the recording interface,
      stores the plurality of media signals in a media file on the non-removable storage,
      receives a disable recording indication, and
      in response to the disable recording indication, permanently disabling capability of the media player to record onto the non-removable storage.

8. The player of claim 7, wherein the plurality of media signals comprises audio signals, video signals, or textual signals.

9. The player of claim 7, wherein in response to the disable recording indication, the controller permanently disables through the recording interface the capabilities of the media player to record onto the non-removable storage.

10. The player of claim 7, wherein the controller further plays content from the media file.

11. The player of claim 10, wherein the media player comprises a non-replaceable and non-rechargeable battery as a power source, wherein the controller cannot play the media file once the battery is fully discharged.

12. The player of claim 10, wherein the controller cannot play the media file once the media file has been played a predetermined number of times.

13. The player of claim 10, wherein the controller cannot play the media file after a predetermined period of time.

14. The player of claim 7, further comprising a system on a chip (SOC), wherein the controller and the non-removable storage are integrated on the SOC.

15. A computer readable storage medium comprising program instructions for recording content onto a media player, the program instructions configured to:
   receive a plurality of media signals through a recording interface;
   store the plurality of media signals in a media file on a non-removable storage;
   receive a disable recording indication; and
   in response to the disable recording indication, permanently disable capabilities of the media player to record onto the non-removable storage.

16. The medium of claim 15, wherein the plurality of media signals comprises audio signals, video signals, or textual signals.

17. The medium of claim 15, wherein the program instructions configured to permanently disable the capabilities of the media player to record onto the non-removable storage are further configured to:
   in response to the disable recording indication, permanently disable through the recording interface the capabilities of the media player to record onto the non-removable storage.

18. The medium of claim 15, wherein the program instructions are further configured to:
   play content from the media file.

19. The medium of claim 18, wherein the media player comprises a non-replaceable and non-rechargeable battery as a power source, wherein the program instructions are further configured to:
   stop playing of the media file once the battery is fully discharged.

20. The medium of claim 18, wherein the program instructions are further configured to stop playing of the media file after a predetermined period of time.

21. A computer readable storage medium comprising program instructions for recording content onto a media player, the program instructions configured to:
   receive a plurality of media signals through a recording interface;
   store the plurality of media signals in a media file on a non-removable storage;
   receive a disable recording indication; and
   permanently disable recording capabilities of the media player in response to the disable recording indication.

22. The medium of claim 21, wherein the program instructions configured to store the plurality of media signals in the media file on the non-removable storage are further configured to:
   convert the plurality of media signals; and
   store the converted plurality of media signals in the media file on the non-removable storage.

23. The medium of claim 21, wherein the program instructions configured to store the plurality of media signals in the media file on the non-removable storage are further configured to:
   determine the plurality of media signals comprises an end of media file indication; and
   complete the storing of the plurality of signals in the media file on the non-removable storage in response to the end of media file indication.

24. The medium of claim 21, wherein the program instructions configured to permanently disable the recording capabilities of the media player in response to the disable recording indication are further configured to:
permanently disable the recording interface.

25. The medium of claim 21, wherein the program instructions configured to permanently disable the recording capabilities of the media player in response to the disable recording indication are further configured to:
permanently stop accepting any media signals from the recording interface.

26. The medium of claim 21, wherein the program instructions configured to permanently disable the recording capabilities of the media player in response to the disable recording indication are further configured to:
discard any further media signals received from the recording interface.

27. The medium of claim 21, wherein the program instructions configured to permanently disable the recording capabilities of the media player in response to the disable recording indication are further configured to:
physically and permanently disable the recording interface.

28. The medium of claim 21, wherein the program instructions are further configured to:
receive a play indication from a user input interface to play the media file stored in the media player;
retrieve content from the media file;
play the content.

29. The medium of claim 28, wherein the content from the media file comprises additional information about the content, wherein the additional information is displayed.

* * * * *